(12) United States Patent
Westenberg et al.

(10) Patent No.: US 8,095,828 B1
(45) Date of Patent: Jan. 10, 2012

(54) USING A DATA STORAGE SYSTEM FOR CLUSTER I/O FAILURE DETERMINATION

(75) Inventors: Guido Westenberg, Columbia Heights, MN (US); Joshua Kruck, St. Paul, MN (US)

(73) Assignee: Symantec Corporation, Mountain View, CA (US)

( * ) Notice: Subject to any disclaimer, the term of this patent is extended or adjusted under 35 U.S.C. 154(b) by 157 days.

(21) Appl. No.: 12/551,260

(22) Filed: Aug. 31, 2009

(51) Int. Cl.
*G06F 11/00* (2006.01)
(52) U.S. Cl. .......................................... 714/20
(58) Field of Classification Search .................. None
See application file for complete search history.

(56) References Cited

U.S. PATENT DOCUMENTS

| | | | | |
|---|---|---|---|---|
| 5,546,536 A | * | 8/1996 | Davis et al. ..................... | 714/20 |
| 5,577,240 A | * | 11/1996 | Demers et al. ..................... | 1/1 |
| 5,832,518 A | * | 11/1998 | Mastors ..................... | 1/1 |
| 6,092,087 A | * | 7/2000 | Mastors ..................... | 1/1 |
| 6,584,582 B1 | * | 6/2003 | O'Connor ..................... | 714/21 |
| 6,658,590 B1 | * | 12/2003 | Sicola et al. ..................... | 714/6.21 |
| 6,910,178 B1 | | 6/2005 | Kiselev et al. | |
| 6,928,513 B2 | * | 8/2005 | Lubbers et al. ................ | 711/114 |
| 7,032,131 B2 | * | 4/2006 | Lubbers et al. ................ | 714/16 |
| 7,197,520 B1 | | 3/2007 | Matthews et al. | |
| 7,325,161 B1 | | 1/2008 | Rakic et al. | |
| 7,328,373 B2 | * | 2/2008 | Kawamura et al. ............. | 714/20 |
| 7,360,110 B1 | | 4/2008 | Schmokel et al. | |
| 7,386,755 B2 | * | 6/2008 | Eguchi et al. ................. | 714/6.12 |
| 7,536,588 B2 | * | 5/2009 | Hafner et al. ................. | 714/6.22 |
| 7,711,986 B2 | * | 5/2010 | Ozawa et al. ................... | 714/20 |
| 2005/0172166 A1 | * | 8/2005 | Eguchi et al. .................. | 714/20 |
| 2009/0013213 A1 | * | 1/2009 | Kalman et al. ................. | 714/20 |

* cited by examiner

*Primary Examiner* — Christopher McCarthy
(74) *Attorney, Agent, or Firm* — Meyertons, Hood, Kivlin, Kowert & Goetzel, P.C.; Dean M. Munyon

(57) ABSTRACT

Techniques are disclosed relating to storing a log of write operations made to a first storage device by one of a plurality of host computers running an instance of a distributed application. The log of write operations is stored at a second storage device. The plurality of host computers communicate status information to the second storage device over respective communication paths. Upon a failure to communicate status information between one of the host computers and the second storage device, the second storage device reads from a predetermined location in the first storage device to determine whether the host computer is still performing write operations. If the second storage device reads an expected signature value written by the host computer, the host computer is deemed to have written data, which indicates that the host computer is operational but that the write operations have not been recorded by the second storage device.

20 Claims, 12 Drawing Sheets

USING A DATA STORAGE SYSTEM FOR CLUSTER I/O FAILURE DETERMINATION

BACKGROUND

1. Technical Field

This disclosure relates generally to data storage systems and, more specifically, to using a data storage system to determine a source of failure in a distributed computing environment such as a clustered computing environment.

2. Description of the Related Art

Data storage systems are often employed to preserve valuable content for future use. In order to protect against the failure of individual storage devices, content is typically stored in redundant storage systems. In some situations, data storage systems may also store a log of changes that are made to content over time to enable the reconstruction of previous states of the content. For example, a backup device might include a copy of a file and a log of every change made to that file. Various types of computer programs, including SYMANTEC'S NETBACKUP REALTIME product, may implement continuous data protection (CDP) functionality, in which changes to data content on a storage system are automatically logged in real time, permitting reconstruction of the data. It would be desirable to extend such functionality to an application executing in a distributed computing environment such as a clustered computing environment.

SUMMARY

In one embodiment, a method for determining a source of failure in a cluster configuration is disclosed. The method includes a first storage device storing a log of write operations to a second storage device, where the write operations are made by different instances of a distributed application executing on a plurality of host computer systems. The method further includes the first storage device determining whether a failure to receive status information from a first of the plurality of host computer systems indicates a) that write operations from the first host computer system to the second storage device have ceased, or b) that write operations are being made by the first host computer system to the second storage device without being logged by the first storage device.

In some embodiments, the plurality of host computer systems is arranged in a cluster configuration, and the first and second storage devices are implemented within a storage area network (SAN). In some embodiments, information in the log of write operations is usable to reconstruct a previous state of the second storage device. Receipt of the status information by the first storage device from the first host computer system indicates that the first host computer system and a first communication path between the first host computer system and the first storage device on which the status information is transmitted are currently operational.

In some embodiments, the method further includes, in response to determining that the write operations from the first host computer system to the second storage device have ceased, storing additional, subsequent write operations in the log, wherein the additional write operations are made by instances of the distributed application executing on ones of the plurality of host computer systems other than the first host computer system.

In some embodiments, the determining includes, after detecting the failure to receive status information, the first storage device performing a check whether the second storage device is storing an indication that the first host computer system is performing write operations to the second storage device.

In some embodiments, the method further includes, in response to the first storage device determining that write operations are being made by the first host computer system to the second storage device without being logged by the first storage device, the first storage device disallowing reconstruction of any previous state of the second storage device generated after the first storage device fails to receive the status information, where the disallowing continues until a corrective action is taken.

In some embodiments, the stored indication is stored in a storage location of the second storage device that previously stored data written by one of the instances of the distributed application.

In one embodiment, an article of manufacture is disclosed that includes a computer readable medium having program instructions stored thereon that, if executed by a first of a plurality of host computers implementing a distributed application, cause the first host computer to perform a method. The method includes receiving information indicative of a write operation from a first instance of the distributed application executing on the first host computer. The method further includes providing the information indicative of the write operation to a first storage device and providing information to a second storage device, where the information provided to the second storage device is usable to recreate the write operation. The method further includes sending heartbeat information to the second storage device via a first communication path to indicate that the first host computer is operational. The method further includes in response to detecting an error in providing the information to the second storage device via the first communication path, communicating to second storage device via a second communication path to indicate that the first host computer remains operational.

In some embodiments, the plurality of host computers are within a cluster configuration, and the first and second storage devices are located within a storage area network (SAN).

In some embodiments, the communicating to the second storage device via the second communication path includes the first host computer storing a signature in a memory storage location of the first storage device, where the signature indicates to the second storage device that the first host computer has written data to the first storage device.

In some embodiments, the method further includes the first host computer determining whether the stored signature has been modified by the second storage device within a predetermined time period, where modification of the signature indicates that the second storage device is operational.

In some embodiments, the method further includes in response to determining that the stored signature has not been modified within the predetermined time period, the first host computer replacing the stored signature with a set of data that was previously overwritten by said storing of the signature, where the set of data was written by an instance of the distributed application.

In some embodiments, the received information is captured from an I/O stack of the first host computer, where the I/O stack is configured to buffer write operations made by the first instance of the distributed application.

In some embodiments, the method further includes the first host computer providing additional information to the second storage device, where the additional information is usable to recreate write operations made to a plurality of other storage devices. The communicating includes the first host computer storing a signature on a single one of the second storage device and the plurality of other storage devices, where the signature indicates that the first host computer has written data to the second storage device or one of the plurality of other storage devices.

In some embodiments, the method further includes the first host computer indicating that the heartbeat information will no longer be sent to the second storage device.

In one embodiment, an article of manufacture is disclosed that includes a computer readable medium having program instructions stored thereon that, if executed by a first storage system, cause the first storage system to perform a method. The method includes a first storage system maintaining information indicative of write operations made by a plurality of host computer systems to a second storage system. The maintaining includes receiving status information from at least a first of the plurality of host computer systems, where the status information indicates that the first host computer system and a first communication path between the first host computer system and the first storage system are operational. The maintaining further includes in response to the first storage system not receiving the status information from the first host computer system within a predetermined time period, determining a) whether write operations from the first host computer system to the second storage system have ceased, or b) whether write operations are being made by the first host computer system to the second storage system without being recorded by the first storage system.

In some embodiments, host computers in the plurality of host computer systems are part of a computer cluster configuration, and the second storage system is arranged in a storage area network (SAN) configuration.

In some embodiments, the determining includes the first storage system entering a mode of operation in which the first storage system searches for a signature that has been stored within a guard block on a first of a plurality of logical storage units of the second storage system by the first host computer system, where the signature indicates that the first host computer system has written data to the second storage system.

In some embodiments, the plurality of logical storage units are associated with a plurality of physical storage units located within a common enclosure. The first storage system searches for the signature on a single one of the plurality of logical storage units.

In some embodiments, the determining includes determining whether the first host computer system or the first communication path has failed.

DETAILED DESCRIPTION

Figure 1:
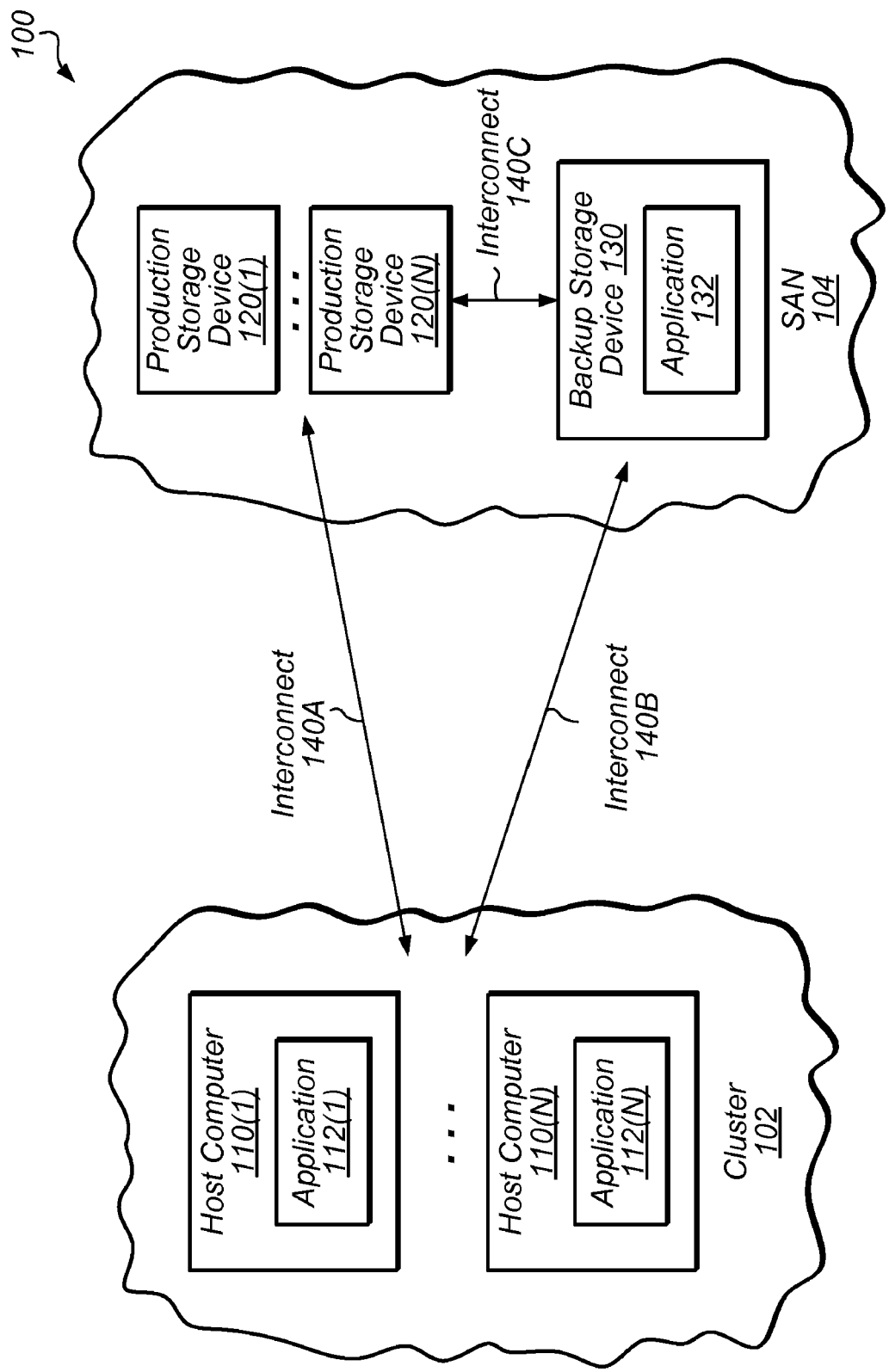
FIG. 1 is a block diagram illustrating one embodiment of a data storage system.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Computer System." This term has its ordinary and accepted meaning in the art, and includes one or more computing devices operating together and any software stored thereon. A computing device includes one or more processor units and a memory subsystem. A memory subsystem may store program instructions executable by the one or more processor units.

"Storage Device." This term has its ordinary and accepted meaning in the art, which includes a computing device that stores data generated by a computer system.

"Distributed Computing." This term has its ordinary and accepted meaning in the art, which includes a system that consists of multiple (often autonomous) computer systems/computing devices that interact with each other via a network to perform a given task. Each computer system/computing device may execute an instance of a distributed application. Various forms of distributed computing may include cloud computing and computer clusters.

"Distributed Application." This term has its ordinary, and accepted meaning in the art, which includes an application that can be divided across multiple computers in a distributed computing environment. One example of a distributed application might be a travel reservation system capable of being used substantially simultaneously by many different users.

"Instance." As used herein, an "instance" of a "distributed application" refers to the code or program instructions executed, loaded, or installed on a particular computer system or computing device that implements a portion of a distributed application. In the example given above, the program instructions residing on a computer system/computing device of a travel agent may implement an instance of a client portion of the distributed travel reservation system.

"Host Computer System." This term has its ordinary and accepted meaning in the art, and includes an individual computer system that executes an instance of a distributed application.

"Communication Path." This term has its ordinary and accepted meaning in the art, which includes any means for communicating between a source and destination. As used herein, a communication path may include a bus, a network, one or more switching devices, etc. Techniques described in this disclosure may be used to determine if there is a failure in the communication path (e.g., there is a loss of network connectivity, an intermediate switching or routing device is not functioning, etc.).

"Status information." This term refers broadly to information that indicates the operational status of a computing device. As used herein, the term "status information" includes "heartbeat information," which is information transmitted by a first computer system to indicate to a second computer system that the first computer system and/or that the communication path between the first and second computer systems is operational. In one embodiment, receipt of the heartbeat information by the second computer system indicates, by itself, that the first computer system and the communication path therebetween are currently operational. In other embodiments, heartbeat information may include specific values indicating that the first computer system and communication path are currently operational. In embodiments described herein, the failure to receive status information with a certain time period (e.g., at certain regular intervals) may be used to indicate that the first computer system or communication path has failed.

"Cluster Configuration." This term has its ordinary and accepted meaning in the art, which includes a group of linked computing devices implementing a common task.

"Storage Area Network (SAN)." This term has its ordinary and accepted meaning in the art, which includes an architecture that enables a computing device to communicate with one or more storage devices via a network. In many instances, a SAN includes storage devices of dissimilar types.

"Corrective Action." This term refers broadly to an action that is performed in response to a problem identified in a computer system. In some embodiments, a corrective action may ameliorate the effects of the identified problem; in other embodiments, the corrective action may simply correspond to providing a warning or notification (e.g., to a user). The term includes, in one embodiment, synchronizing content between a production storage device and a backup storage device in response to an identified failure.

"Signature." This term refers broadly to a set of information, and may be used to communicate that a given computing device has written data to a production storage device. In one embodiment, a signature may correspond to a predetermined data value, such that a first computer system may write the predetermined data value to a storage location and a second computer system may read the written data value. Because, in this example, the data value is "predetermined" (that is, "known" to the first and second computer systems), this value may be used to communicate information between the first and second computer systems.

"Guard Block." This term refers broadly to a location within a memory or storage system that stores or is capable of storing information such as a signature. As described herein, a guard block may be a location in a production storage device that has been used for storing production data (that is, data being used by an application such as a distributed application), and is temporarily converted to use as a "guard block" in order to communicate information between a host computer system and a backup appliance storage system. In such an embodiment, the guard block may be "freed" after use, such that it can subsequently be used for production storage.

"Logging." This term refers broadly to the insertion of information into a log (which is used broadly to refer to a set of information being stored, e.g., in a data structure or dedicated memory). For example, a backup storage device may log write operations as they are performed by storing information about the write operations to a predetermined location.

Turning now to FIG. 1, one embodiment of a data storage system 100 is shown. The present disclosure describes various embodiments of host computers and a backup storage device within such a system. As will be described below, embodiments of the backup storage device may provide continuous data protection (CDP) to a plurality of host computers arranged in, e.g., a cluster configuration by maintaining a log or other storage of write operations that were made by the host computers to "production storage" devices. (As used herein, the term "production storage" is used to indicate one or more storage devices that include data being backed up by, e.g., a backup appliance.) When a communication path between a given one of the plurality of host computers and the backup storage device fails but the communication path between the given host computer and the production storage devices is still operational, the log of write operations may become corrupted if the given host computer writes additional information to one of the production storage devices without notifying the backup storage device. In order to prevent this possibility of corruption, embodiments of the backup storage device described below can determine whether write operations from a host computer to production storage devices have ceased, or whether write operations are being made by the host computer to the production storage devices without being recorded by the backup storage device. The backup storage device may then take different actions in these different cases. In the event that write operations of a host computer have ceased (e.g., because a failure of the host computer has occurred), the backup storage may continue to store write operations generated by other host computers. (In many embodiments of a clustered computing environment, the failure of one "node" of the cluster should not compromise the operation of remaining nodes of the cluster.) On the other hand, if write operations are being made by the host computer without being recorded by the backup storage device (e.g., because a communication path between a host computer and the backup storage has failed), the backup storage device may disallow reconstruction of previous states of a production storage device generated after the backup storage device stopped receiving an indication of the write operations made by the host computer. The backup storage device may continue preventing reconstruction of those states until some corrective action is taken. For example, the backup storage device may need to synchronize with any production storage devices written to after it stopped receiving indications of write operations from a given host computer in order to allow the reconstruction of those states. Such techniques may be advantageous because the backup storage device may continue to store write operations for the cluster of host computers even if an individual host computer in the cluster experiences a failure.

As shown in FIG. 1, system 100 includes a cluster 102 of host computers 110(1)-(N) that are coupled to a storage area network (SAN) 104 via interconnects 140 A and B. SAN 104 includes production storage devices 120(1)-(N) and backup storage device 130. Host computers 110 may interact with production storage devices 120 via interconnect 140 A, and with backup storage device via interconnect 140B. Backup storage device 130 may communicate with production storage devices 120 via interconnect 140C. In one embodiment, host computers 110 and backup storage device 130 execute applications 112(1)-112(N) and application 132, respectively. As will be described below, applications 112 and 132 may be complementary applications that are configured to communicate with one another.

In one embodiment, host computer 110 performs write operations to production storage devices 120 via interconnect 140A and provides information that is usable to recreate the performed write operations to backup storage device 130 via interconnect 140B. (In one embodiment, the provided information may include, for a given write operation, a write address, write data, and a timestamp. Accordingly, upon a failure of device 120, the stored log of write operations could be used in conjunction with a backup performed at a first point in time to recreate the state of device 120 at a second point in time subsequent to the first point in time.) Thus, application 112 executing on host computer 110(1) may write a set of data to a block of memory in production storage device 120(1) and then also provide an indication of the write operation to backup storage device 130 (this process may be referred to as "splitting" writes). In one embodiment, an application 112 of a host computer 110 manages I/O operations with production storage devices 120 and backup storage device 130. In some embodiments, host computers 110 are arranged in a cluster-computing environment such as cluster 102 in which host computers 110 function in parallel by executing different instances of a distributed application. As will be described below, embodiments of a host computer 110 may send heartbeat information at predetermined intervals to backup storage device 130 via interconnect 140B to indicate that the host computer 110 remains operational and to indicate that interconnect 140B also remains operational. If the host computer 110, however, cannot provide an indication of a write operation to backup storage device 130 (e.g., either because of a failure of a communication path between computer 110 and device 130 or a failure of device 130 itself), the host computer 110 may communicate that it is performing write operations to the backup storage device 130 using an alternate communication path (e.g., interconnects 140A and 140C, which may, for purposes of this disclosure, collectively form one communication path). For example, in some embodiments, the host computer 110 is configured to store a signature in a location of one or more of the production storage devices 120. In such an embodiment, backup storage device 130 may then determine that the host computer 110 has performed a write operation by retrieving the signature via interconnect 140C. Host computers 110 are described in more detail below in conjunction with FIG. 2.

In one embodiment, interconnects 140 may include networks of communication paths coupling host computers 110, production storage devices 120, and backup storage device 130 to one another. In the illustrated embodiment, interconnects 140 are shown as being separate from one another. In other embodiments, interconnects 140 may refer to the same transmission medium. For example, interconnect 140A and 140B may be the same communication bus. In some embodiments, interconnects 140 are fiber channel (FC) networks. Interconnects 140 may also include various bus structures and associated devices (e.g., buffers), as well as network devices such as routers, switches, etc.

In one embodiment, production storage devices 120 store data received from host computers 110 via interconnect 140A. In some embodiments, the stored data is generated by instances of a distributed application executing on host computers 110. In the illustrated embodiment, production storage devices 120 are located within SAN 104. In other embodiments, production storage devices 120 may be configured differently. In various embodiments, production storage devices 120 are assigned logical unit numbers (LUNs) that correspond to a respective logical storage unit. In order to access a given production storage device 120, a host computer 110 may address operations to the LUN of that production storage device 120. As will be described below, production storage devices may store a signature of a host computer 110. Backup storage device 130 may later retrieve the stored signature in order to determine whether that host computer 110 remains operational. A SAN architecture in which production storage devices 120 and backup storage 130 may be included in one embodiment is described below in conjunction with FIG. 3.

In one embodiment, backup storage device 130 stores a log of write operations that are made to production storage devices 120, where the stored log is usable to reconstruct a previous state of a respective device 120. As noted above, in some embodiments, the write operations are made by different instances of a distributed application executing on host computers 110. In various embodiments, backup storage device 130 may (or may not) be located within SAN 104. In some embodiments, backup storage device 130 may be assigned a logical unit number (LUN) associated with a logical storage unit. As will be described below, backup storage device 130 may receive heartbeat information that indicates that a given host computer 110 is operational, via communication path of interconnect 140B. If the backup storage device 130 fails to receive the heartbeat information within predetermined period, backup storage device 130 may be configured to determine whether the failure indicates a) that write operations from the host computer 110 to production storage devices 120 have ceased (e.g., because of a failure of the host computer 110), or b) that write operations are being made by the host computer 110 without being logged by backup storage device 130 (e.g., because of a failure of the communication path). In some embodiments, backup storage device 130 is configured to determine the source of failure by entering an operational mode in which backup storage device 130 searches for a signature that has been stored within a guard block—one or more storage locations on production storage devices 120. In such embodiments, finding the expected signature indicates that the host computer 110 continues to perform write operations to production storage devices 120. On the other hand, not finding the expected signature may indicate that the host computer 110 is not writing to production storage devices 120 and that therefore the data stored by backup storage 130 continues to be complete and valid for reconstruction of data during this failure. An embodiment of backup storage device 130 is described below in conjunction with FIG. 5.

Figure 2:
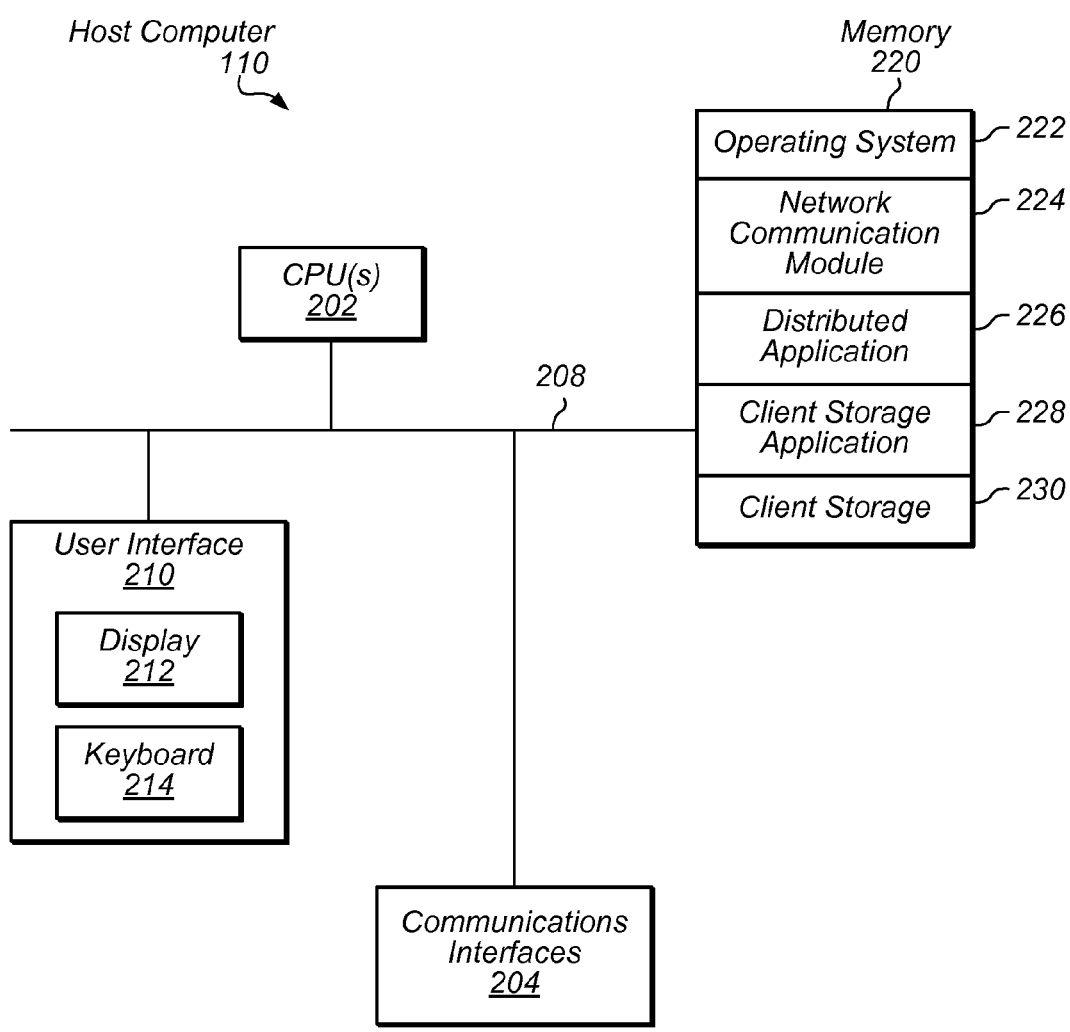
FIG. 2 is a block diagram illustrating one embodiment of a host computer.

Referring to FIG. 2, one embodiment of a system for implementing host computer 110 is depicted. As shown, host computer 110 typically includes one or more processing units (CPUs) 202, one or more network or other communications interfaces 204, memory 220, and one or more communication buses 208 for interconnecting these components. The host computer 110 may include a user interface 210, for instance a display 212 and a keyboard 214.

Memory 220 may include high speed random access memory and may also include non-volatile memory, such as one or more magnetic or optical storage disks. Memory 220 may include mass storage that is remotely located from CPUs 202. Memory 220 may store the following elements, or a subset or superset of such elements: an operating system 222 that includes procedures for handling various basic system services and for performing hardware dependent tasks; a network communication module (or instructions) 224 that is used for connecting the client system 102 to other computers via the one or more communications interfaces 204 (wired or wireless), such as the Internet, other wide area networks, local area networks, metropolitan area networks, and so on; an instance of a distributed application 226 executing on cluster 102; a client storage application 228 for interacting with production storage devices 120 and backup storage device 130; and client storage 230.

Figure 3:
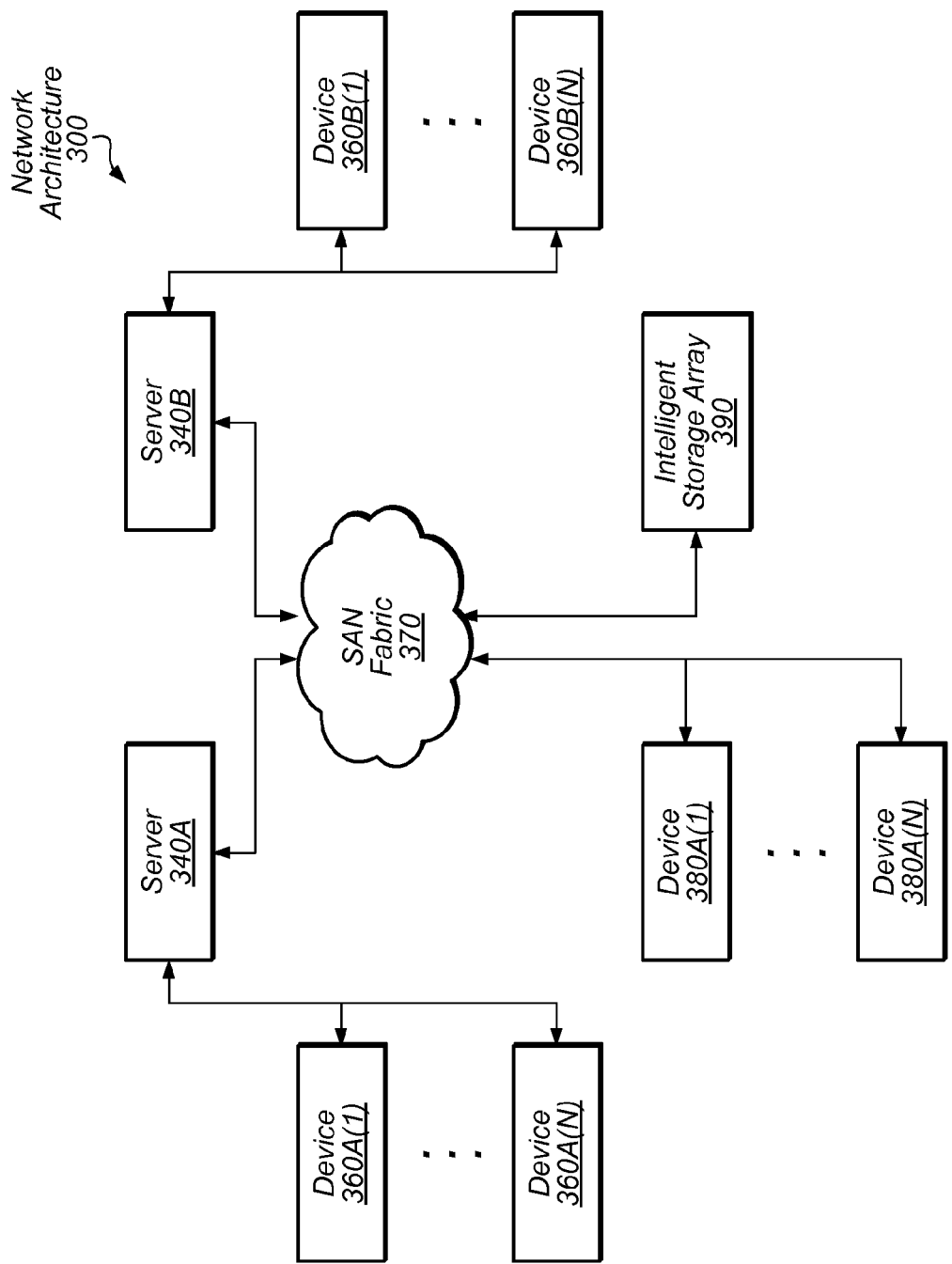
FIG. 3 is a block diagram illustrating one embodiment of a storage area network.

FIG. 3 is a block diagram depicting one embodiment of a network architecture 300 for implementing a storage system such as SAN 104. In one embodiment, various blocks such as storage servers 340A and 340B can be implemented using computer systems similar to computer system 600 discussed below. Storage server 340A is depicted as having storage devices 360A(1)-(N) directly attached, and storage server 340B is depicted with storage devices 360B(1)-(N) directly attached. Storage servers 340A and 340B are also connected to a SAN fabric 370, although connection to a storage area network is not required in all embodiments. In some embodiments, various other types of networks, such as Ethernet networks may be used in place of SAN fabric 370. In one embodiment, SAN fabric 370 supports access to storage devices 380(1)-(N) by storage servers 340A and 340B, and so by client systems 310, 320 and 330 via network 350. Intelligent storage array 390 is also shown as an example of a specific storage device accessible via SAN fabric 370. In various embodiments, various components or network architecture 300 may be implemented as part of a cloud computing platform. As noted above, production storage devices 120 and backup storage device 130 may be included within a SAN in one embodiment.

Figure 4:
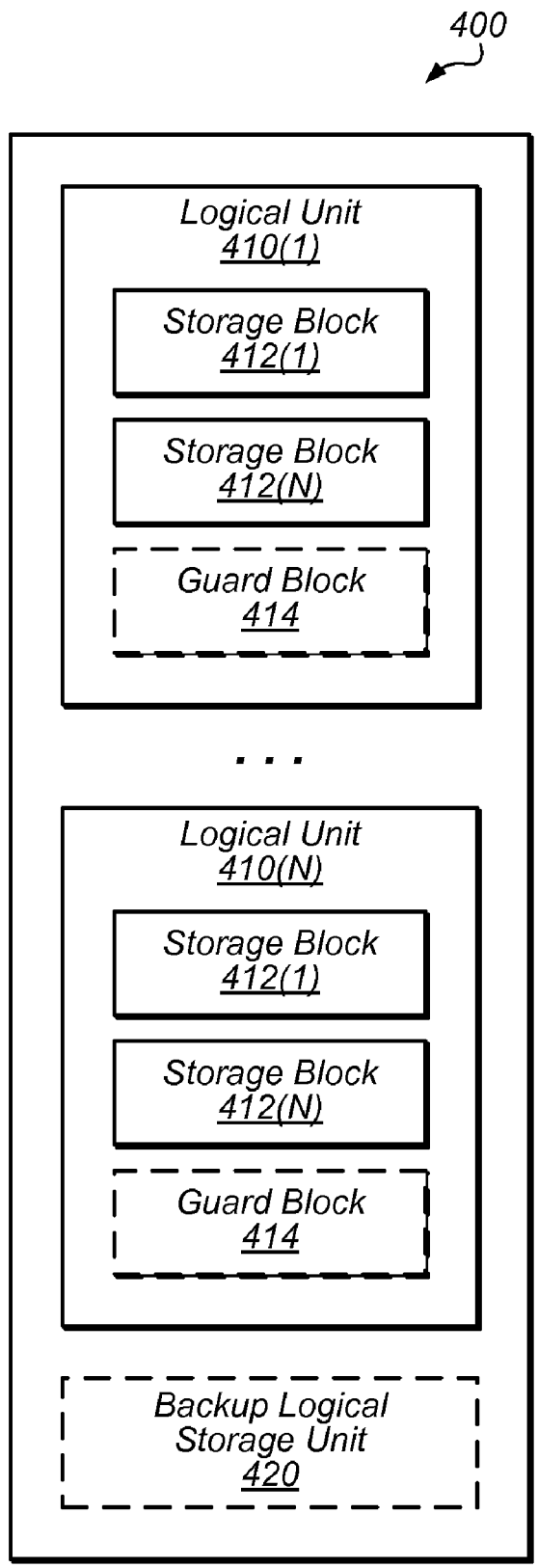
FIG. 4 is a block diagram illustrating one embodiment of a storage architecture that uses logical storage units.

Turning now to FIG. 4, one embodiment of a production storage system 400 in which physical storage devices are represented as logical storage units is depicted. In the illustrated embodiment, system 400 includes a plurality of logical storage units 410(1)-(N) representative of production storage devices 120. Each logical storage unit 410 includes a plurality of storage blocks 412 corresponding to portions of memory within a production storage device 120. Logical storage units 410 may (or may not, as indicated by the dotted line) include a guard block 414 describe below. In various embodiments, system 400 may also include a backup logical storage unit 420 representative of backup storage device 130.

In one embodiment, a guard block 414 is configured to store a signature written by a host computer 110 to indicate that the computer 110 is operational and performing write operations when it cannot provide indications of the write operations and send heartbeat information to backup storage device 130 (e.g., because of a failure in a communication path between computer 110 and device 130). In some embodiments, guard block 414 is a designated storage block 412 (i.e., the block is known to both computers 110 and device 130) within logical storage unit 410. In certain embodiments, the location of guard block 414 has been selected because it is known to be unused or less likely to be used for storage of application data.

In one embodiment, a host computer 110 may store application data in a storage location subsequently selected as guard block 414. Accordingly, host computer 110 may subsequently overwrite the data in block 414 with a signature. In one embodiment, host computer 110 may locally preserve a copy of the application data that is overwritten so that it can be restored at a later point. In some embodiments, a host computer 110 stores a signature in a respective guard block 414 of logical storage unit 410 before it writes to that logical storage unit 410 for the first time after determining that it cannot split a write operation. (In this manner, the guard block may function as a "dirty" bit.) In some embodiments, each logical storage unit 410 includes a guard block 414. In other embodiments, a designated logical storage unit 410 includes a guard block 414 associated with a group of logical storage units 410. For example, in one embodiment, a guard block is located in a designated one of a plurality of logical storage units corresponding to a group of physical storage units located within a common enclosure (e.g., a single physical housing). Thus, after failing to receive heartbeat information, if a host computer 110 accesses a logical storage unit corresponding to one of the physical storage units, the host computer 110 stores a signature on the designated logical storage unit 410 associated with the group of physical storage units.

Figure 5:
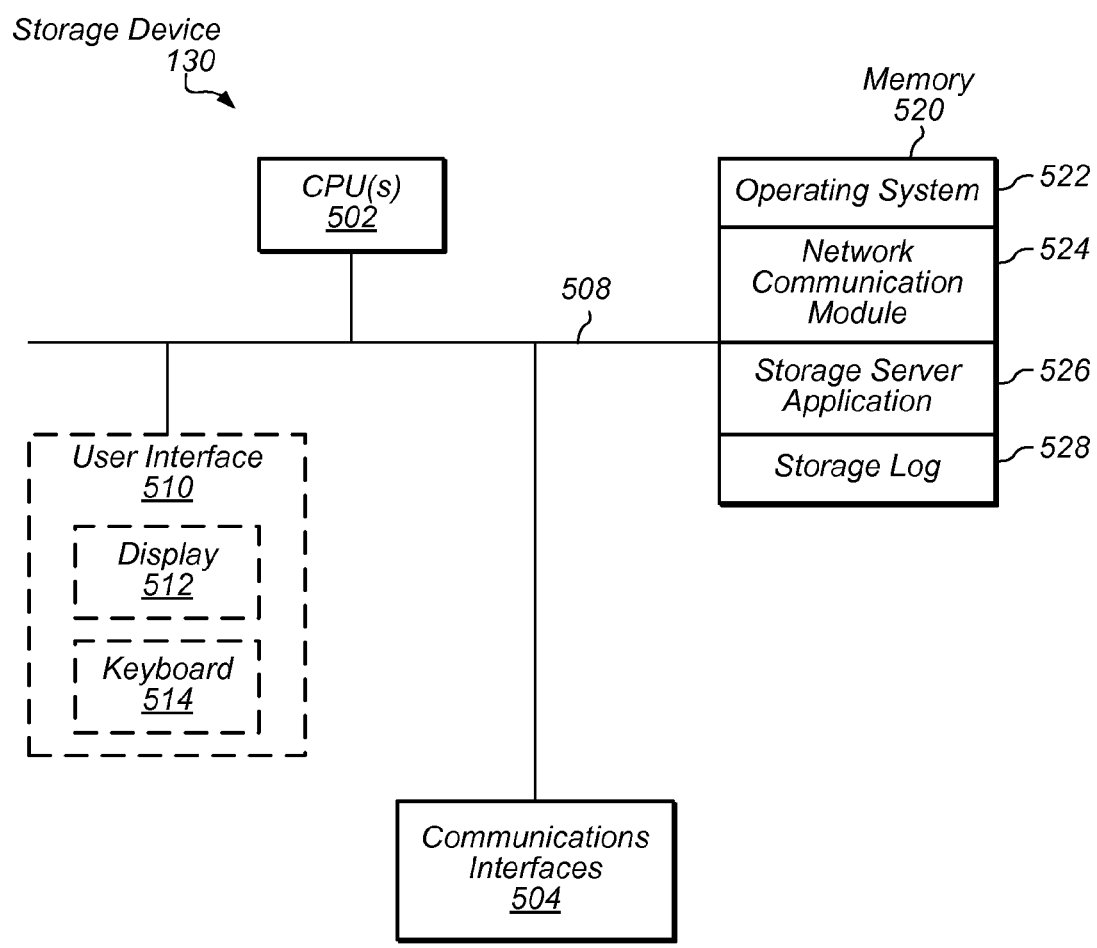
FIG. 5 is a block diagram illustrating one embodiment of a backup storage device.

Referring to FIG. 5, one embodiment of a system for implementing backup storage device 130 is depicted. As shown, backup storage device 130 typically includes one or more processing units (CPUs) 502, one or more network or other communications interfaces 504, memory 520, and one or more communication buses 508 for interconnecting these components. The backup storage device 130 may (or may not) include a user interface 510, for instance a display 512 and a keyboard 514. [Note: the fact that certain items are shown with a solid as opposed to a dotted line does not mean that the items are required in all possible embodiments of the disclosure.]

Memory 520 may include high speed random access memory and may also include non-volatile memory, such as one or more magnetic or optical storage disks. Memory 520 may include mass storage that is remotely located from CPUs 502. Memory 520 may store the following elements, or a subset or superset of such elements: an operating system 522 that includes procedures for handling various basic system services and for performing hardware dependent tasks; a network communication module (or instructions) 524 that is used for connecting the client system 102 to other computers via the one or more communications interfaces 504 (wired or wireless), such as the Internet, other wide area networks, local area networks, metropolitan area networks, and so on; storage server application 526 for interacting with host computers 110; and storage log 528 for storing information associated with write operations made to production storage devices 120.

Figure 6:
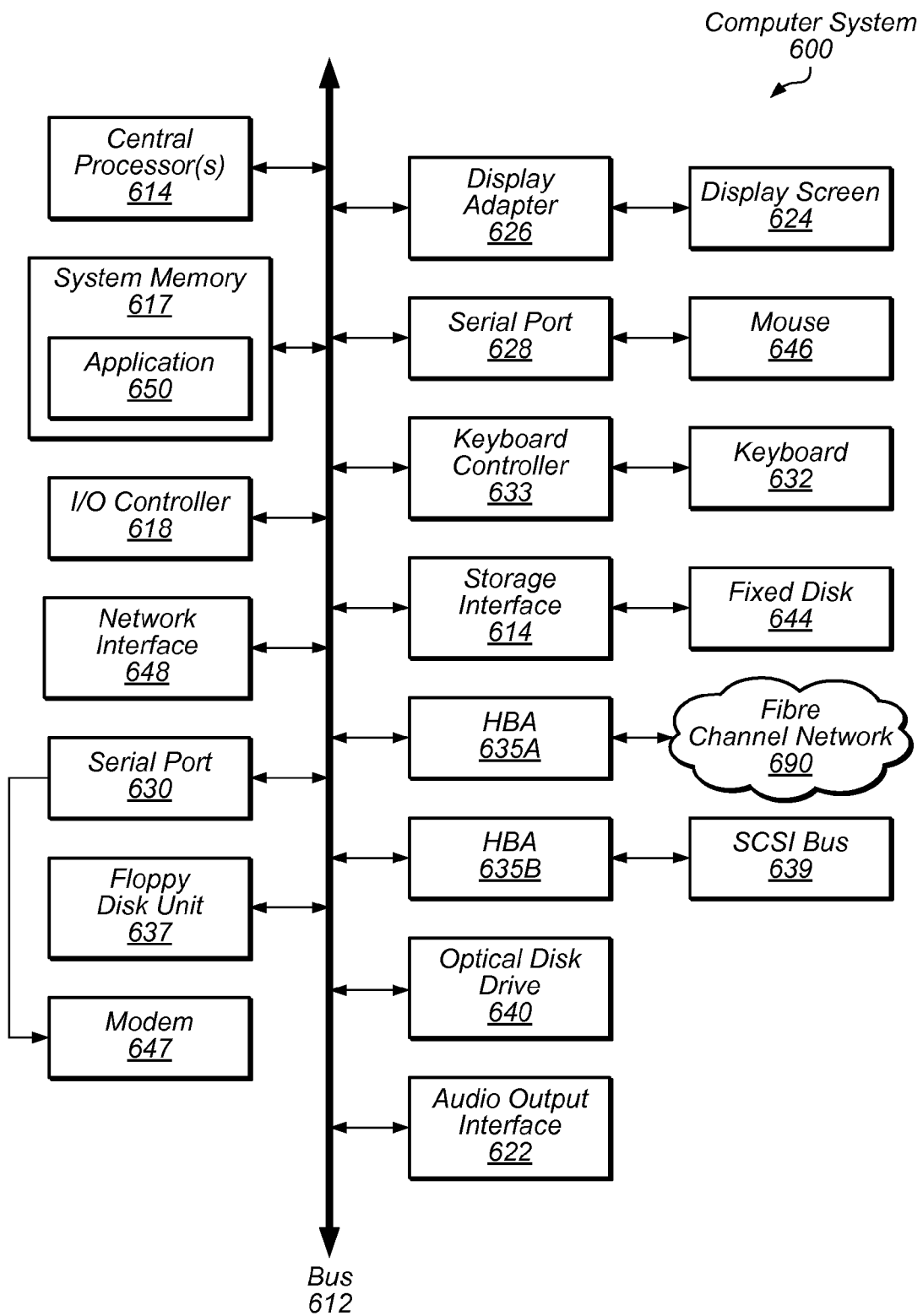
FIG. 6 is a block diagram illustrating one embodiment of a representative computer system for implementing a host computer or a backup storage device.

Turning now to FIG. 6, a block diagram of one embodiment of a computer system 600 used to implement host computer 110 or backup storage device 130 is depicted. Computer system 600 includes a bus 612 which interconnects major subsystems of computer system 600, such as a central processor 614, a system memory 617 (typically RAM, but which may also include ROM, flash RAM, or the like), an input/output controller 618, an external audio device, such as a speaker system 620 via an audio output interface 622, an external device, such as a display screen 624 via display adapter 626, serial ports 628 and 630, a keyboard 632 (interfaced with a keyboard controller 633), a storage interface 634, a floppy disk drive 637 operative to receive a floppy disk, a host bus adapter (HBA) interface card 635A operative to connect with a Fibre Channel network 690, a host bus adapter (HBA) interface card 635B operative to connect to a SCSI bus 639, and an optical disk drive 640 operative to receive an optical disk. Also included are a mouse 646 (or other point-and-click device, coupled to bus 612 via serial port 628), a modem 647 (coupled to bus 612 via serial port 630), and a network interface 648 (coupled directly to bus 612).

Bus 612 allows data communication between central processor 614 and system memory 617, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 600 are generally stored on and accessed via a computer readable medium, such as a hard disk drive (e.g., fixed disk 644), an optical drive (e.g., optical drive 640), a floppy disk unit 637, or other storage medium. Additionally, applications can be in the form of electronic signals modulated in accordance with the application and data communication technology when accessed via network modem 647 or interface 648. System memory 617 may comprise program instructions (such as application 650) to implement various techniques described below.

Storage interface 614, as with the other storage interfaces of computer system 600, can connect to a standard computer readable medium for storage and/or retrieval of information, such as a fixed disk drive 644. Fixed disk drive 644 may be a part of computer system 600 or may be separate and accessed through other interface systems. Modem 647 may provide a direct connection to a remote server via a telephone link or to the Internet via an interne service provider (ISP). Network interface 648 may provide a direct connection to a remote server via a direct network link to the Internet via a POP (point of presence). Network interface 648 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 6 need not be present to practice the present disclosure. The devices and subsystems can be interconnected in different ways from that shown in FIG. 6. The operation of a computer system such as that shown in FIG. 6 is readily known in the art and is not discussed in detail in this application. Code to implement the present disclosure can be stored in computer-readable storage media such as one or more of system memory 617, fixed disk 644, optical disk, or floppy disk. The operating system provided on computer system 600 may be MS-DOS®, MS-WINDOWS®, OS/2®, UNIX®, Linux®, or another known or suitable operating system.

Moreover, regarding any signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 7A:
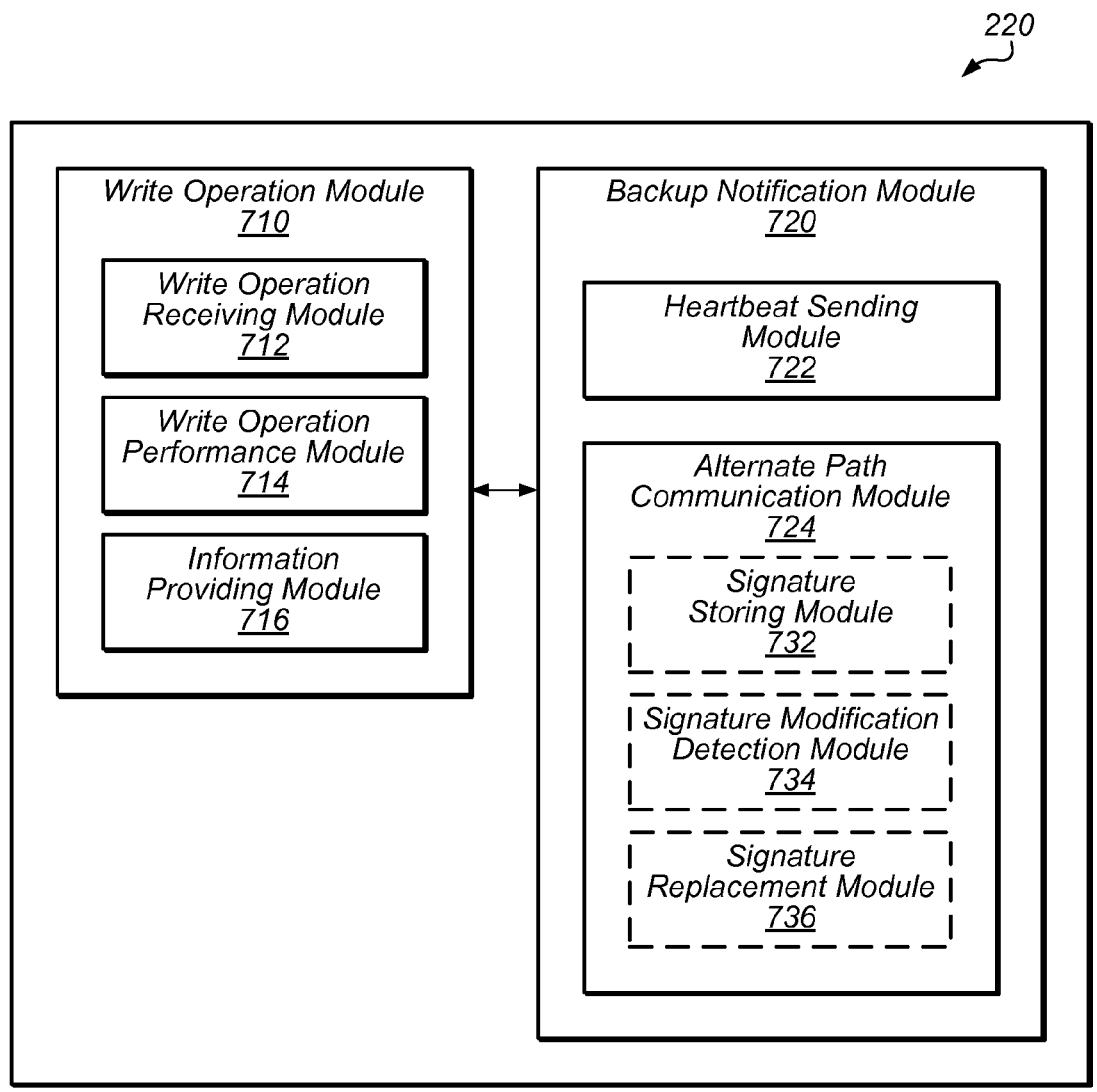
FIG. 7A is a block diagram illustrating one embodiment of various modules within memory of a host computer for determining a source of failure in a cluster configuration.

Turning now to FIG. 7A, a block diagram of various modules within memory 220 of host computer 110 is depicted. As shown, memory 220 includes a write operation module 710 and backup notification module 720. In some embodiments, modules 710 and 720 operate in parallel and interact with one another (this interaction is indicated in FIG. 7A by the double-headed arrow between modules 710 and 720). For example, in one embodiment, instructions within module 720 execute upon an interrupt of the instructions of module 710, wherein the interrupt may occur at regular intervals.

In one embodiment, write operation module 710 includes program instructions that are executable to perform write operations to production storage devices 120 and notifies backup storage device 130 of each performance. Module 710 includes a write operation receiving module 712, a write operation performance module 714, and an information providing module 716. In one embodiment, backup notification module 720 includes instructions executable to communicate with backup storage device 130 to indicate that the host computer 110 is operational. In the embodiment shown, module 720 includes a heartbeat sending module 722 and an alternate path communication module 724. In various embodiments, more or fewer modules may be used. In some embodiments, modules 710 and 720 may include program instructions that are executed by host computer 110 and/or may be implemented by logic within host computer 110.

In one embodiment, write operation receiving module 712 includes program instructions executable to receive information indicative of a write operation from an instance of a distributed application executing on a host computer 110. In some embodiments, module 712 includes instructions executable to capture this information from an I/O stack that buffers write operations on the host computer 110 prior to being performed.

In one embodiment, write operation performance module 714 includes program instructions executable to perform write operations to production storage devices 120 via interconnect 140A. In one embodiment, module 714 includes program instructions executable to communicate with production storage devices 120 using the Internet Small Computer System Interface (ISCSI) protocol. In some embodiments, module 714 may include program instructions executable to perform write operations to logical storage units associated with production storage devices 120 (e.g., logical storage units 410).

In one embodiment, information providing module 716 includes program instructions executable to provide information to backup storage device 130 via a communication path of interconnect 140B, where the provided information is usable to recreate previous write operations. For example, backup storage device 130 may subsequently use this provided information to restore a previous state of a production storage device 120. In some embodiments, module 716 includes program instructions executable to indicate to host computer 110 if it is unable to successfully provide information to device 130. In such an event, host computer 110 may, in one embodiment, enter an operational mode in which computer 110 attempts to communicate to device 130 that it remains operational and that it is performing write operations. Such an attempt may be made via an alternate communication path (e.g., a combination of interconnect 140A, production storage device(s) 120, and interconnect 140C). If execution of program instructions in module 716 subsequently indicates that module 716 can now provide information, host computer 110 may then exit the operational mode.

In one embodiment, heartbeat sending module 722 includes program instructions executable to send heartbeat information to the backup storage device 130 via a communication path used by module 716 for providing information to device 130 (e.g., that includes interconnect 140B, where the heartbeat information indicates that host computer 110 and the communication path are operational. For example, module 722 may execute to send heartbeat information at predetermined time intervals to backup storage device 130 and, in turn, receive a corresponding reply from device 130. In various embodiments, module 722 may also indicate that the heartbeat information will no longer be sent to backup storage device 130 if host computer 110 is shutting down, for example, in the situation in which the host computer is being purposely disconnected from backup storage device 130, etc.

In one embodiment, instructions in alternate path communication module 724 execute to communicate to backup storage device 130 that host computer 110 remains operational and that it is performing write operations. Such communication may be performed via an alternate communication path (e.g., including interconnects 140A and 140C) if instructions in module 716 are unable to execute to provide information via a primary communication path (e.g., via interconnect 140B). In some embodiments, instructions in module 724 may execute to communicate this information to backup storage device 130 before host computer 110 performs any further writes to a production storage device 120. In one embodiment, module 724 includes a signature storing module 732 that includes program instructions executable to communicate with backup storage device 130 by storing a signature in a portion of memory (e.g., guard block 414) of a production storage device 120. Backup storage device 130 may then, in one embodiment, acknowledge the storing of the signature by modifying the stored signature. For example, in some embodiments, backup storage device 130 modifies the stored signature by a replacing the signature with application data that was previously overwritten when the signature was stored.

In one embodiment, module 724 includes a signature modification detection module 734, which includes program instructions executable to determine whether the stored signature has been modified within a predetermined time period. In some embodiments, this predetermined interval may be known to both module 734 and backup storage device 130. In other embodiments, this predetermined interval may be known only to the module 734, but communicated to the backup storage device 130 with each transmission of heartbeat information. In one embodiment, module 732 includes instructions executable to store a signature in a guard block 414 and module 734 may include instructions executable to subsequently determine if backup storage device 130 has modified the signature during a given cycle, where a cycle is the period between two heartbeats. Module 734 may include instruction executable to wait for two cycles to determine if the signature has been modified. In some embodiments, waiting for two cycles may account for differences in clock speeds and I/O delays that might prevent backup storage device 130 from detecting the signature. In various embodiments, each cycle length is determined based on the respective hardware clock on each computer 110. In one embodiment, module 724 also includes a signature replacement module 736 that is executable to replace the stored signature with a set of data that was previously overwritten when the signature was initially stored to the production storage device 120. (For example, a particular location may store a value A that is written by a distributed application. Value A may be saved by instructions executing in module 736 and then the particular location may be used as a guard block that can receive a signature value and then accept an update to the signature value. After this process, the particular location may then be "freed" from being a guard block, with the value A being rewritten to the particular location.)

The operation of modules 710 and 720 is described in greater detail in conjunction with FIG. 7B, which is described next.

Figure 7B:
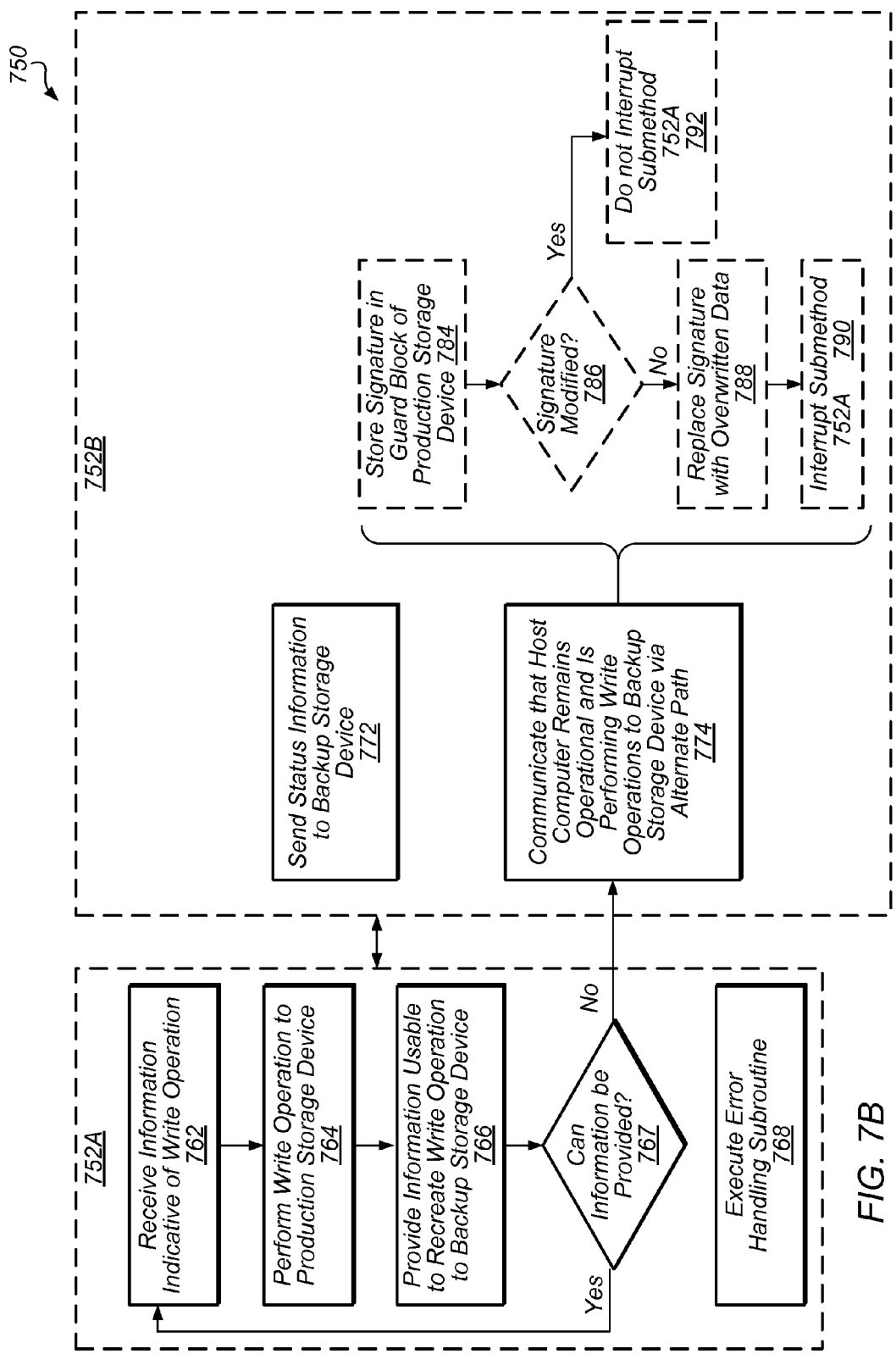
FIG. 7B is a flow diagram illustrating one embodiment of a method implemented by a host computer for determining a source of failure in a cluster configuration.

Turning now to FIG. 7B, one embodiment of a method implemented by a host computer 110 is depicted. As shown, method 750 includes submethods 752A and 752B that may be performed in parallel (or substantially in parallel). Submethods 752A and 752B may also interact with one another (as indicated by the double-headed arrow between submethods 752A and 752B). Submethod 752A is one embodiment of a method for performing a write operation and includes steps 762-768. Submethod 752B is one embodiment of a method for indicating that host computer 110 remains operational and includes steps 772 and 774. Method 750 may be performed using program instructions (e.g., those of application 112) that are executed by host computer 110 and/or using logic within host computer 110.

Submethod 752A begins in step 762 with host computer 110 receiving (e.g., using module 712) information indicative of a write operation from an instance of distributed application 226 executing on host computer 110. In some embodiments, this information is captured from an I/O stack that buffers write operations on the host computer 110 prior to being performed.

In step 764, host computer 110 performs (e.g., using module 714) the write operation to a production storage device 120. (As used herein, "performing" a write operation includes causing a write operation to be performed. In one embodiment, performing includes "intercepting" a write operation from an instance of a distributed application running on host computer 110, capturing information relating to the write operation, and then sending the write operation to production storage device 120, where the write data can actually be stored to production storage.) In one embodiment, host computer 110 communicates to production storage device 120 using the Internet Small Computer System Interface (ISCSI) protocol to convey the write operation initiated by host computer 110. In some embodiments, a write operation initiated by host computer 110 is addressed to a LUN associated with the production storage devices 120.

In step 766, host computer 110 provides (e.g., using module 716) information to backup storage device 130 that is usable to recreate the write operation. This information may include, for example, and address to which data is to be written, along with the data to be written. In some embodiments, a timestamp or other value may be associated with each write operation stored in a log. Backup storage device 130 may then use this information in a subsequent restoration of a state of production storage device 120. In step 767, if host computer 110 can successfully provide information to backup storage device 130, host computer 110 returns to step 762 (steps 762-767 may execute repeatedly while there are no errors). Otherwise, submethod 752A proceeds to step 774 in submethod 752B.

In one embodiment, submethod 752B may cause submethod 752A to be interrupted—for example, to communicate information generated by submethod 752B. In certain embodiments, host computer 110, in step 768, executes an error handling subroutine when submethod 752B indicates an error. In one embodiment, submethod 752A may remain in step 768 until a corrective action is taken, which may allow 752A to return to step 762. When 752B indicates an error, host computer 110 may, in some embodiments, stop performing write operations to production storage devices 120. Host computer 110 may also disconnect itself from production storage devices 120 and backup storage device 130.

In one embodiment, submethod 752B begins in step 772 with host computer 110 sending (e.g., using module 722) status (e.g., heartbeat) information to backup storage device 130 via a primary communication path (e.g., including interconnect 140B). In one embodiment, step 772 may include sending status information to device 130 and determining whether an acknowledgement is received in response thereto. Host computer 110 may repeat step 772 at regular intervals unless it experience any errors in sending the status information—for example, the primary communication path may fail. As will be described below, backup storage device 130, in some embodiments, uses the status information to determine whether to allow the reconstruction of previous states of a production storage device 120. In one embodiment, backup storage device 130 does not permit the reconstruction of any states of a production storage device that are generated after the backup storage device 130 has failed to receive status information. Backup storage device 130 may continue preventing the reconstruction of these states until a corrective action is taken. In the event that host computer 110 is shut down or otherwise purposely disconnected from backup storage device 130, computer 110, in various embodiments, may indicate to device 130 that it will no longer be receiving heartbeat information from computer 110, and that there is no failure of computer 110 or the associated communication path.

In step 774, host computer 110 communicates (e.g., using module 724) that it remains operational and that it is performing write operations to backup storage device 130 via an alternate communication path. For example, host computer 110 may communicate with backup storage device 130 via a communication path that includes interconnects 140A and 140C. In substeps 784-792 described below, host computer 110 communicates with backup storage device 130 via a location or locations in production storage device 120.

In substep 784, host computer 110 stores (e.g., using module 732) a signature in a guard block 414 of a production storage device 120. In one embodiment, host computer 110 enters an operational mode in which it stores a signature in one or more production storage devices 120 when it writes to the device 120 for the first time after the determination in step 767. The writing of the signature may indicate not only that host computer 110 is performing a write operation but also that the particular production storage device 120 may be out of synchronization with the log of write operations stored in backup storage device 130. In some embodiments, host computer 110 may store the signature in a logical storage unit other than the logical storage unit being written to—for example, if a particular LUN in device 120 is being written to, and there is a guard block located in a different LUN that corresponds to a plurality of LUNs that includes the particular LUN currently being written to.

In substep 786, host computer 110 determines (e.g., using module 734) whether backup storage device 130 has modified the stored signature. In one embodiment, host computer 110 waits for the period of two cycles for checking whether the signature has been modified (any suitable wait period may be used). If the signature has been modified, backup storage device 130 may be deemed to be operational, with the implication being that the communication path between host computer 110 and device 130 has failed. Thus, host computer 110 may be prevented from providing the information (in step 767) and sending the heartbeat information (in step 772). In one embodiment, as long as backup storage device 130 remains operational, host computer 110 does not interrupt method 752A (substep 792); computer 110 thus continues to perform write operations to production storage devices 120 (i.e., host computer repeatedly performs steps 762 and 764 even though it may not be able to perform steps 766 or 772). On the other hand, if the signature has not been modified after the expiry of a wait period, backup storage device 130 may be deemed to have failed. As a result, host computer 110 may replace any data that has been overwritten by storage of the signature. In some embodiments, host computer 110 may further interrupt submethod 752A (substep 790) to prevent the performance of any additional write operations.

Figure 8A:
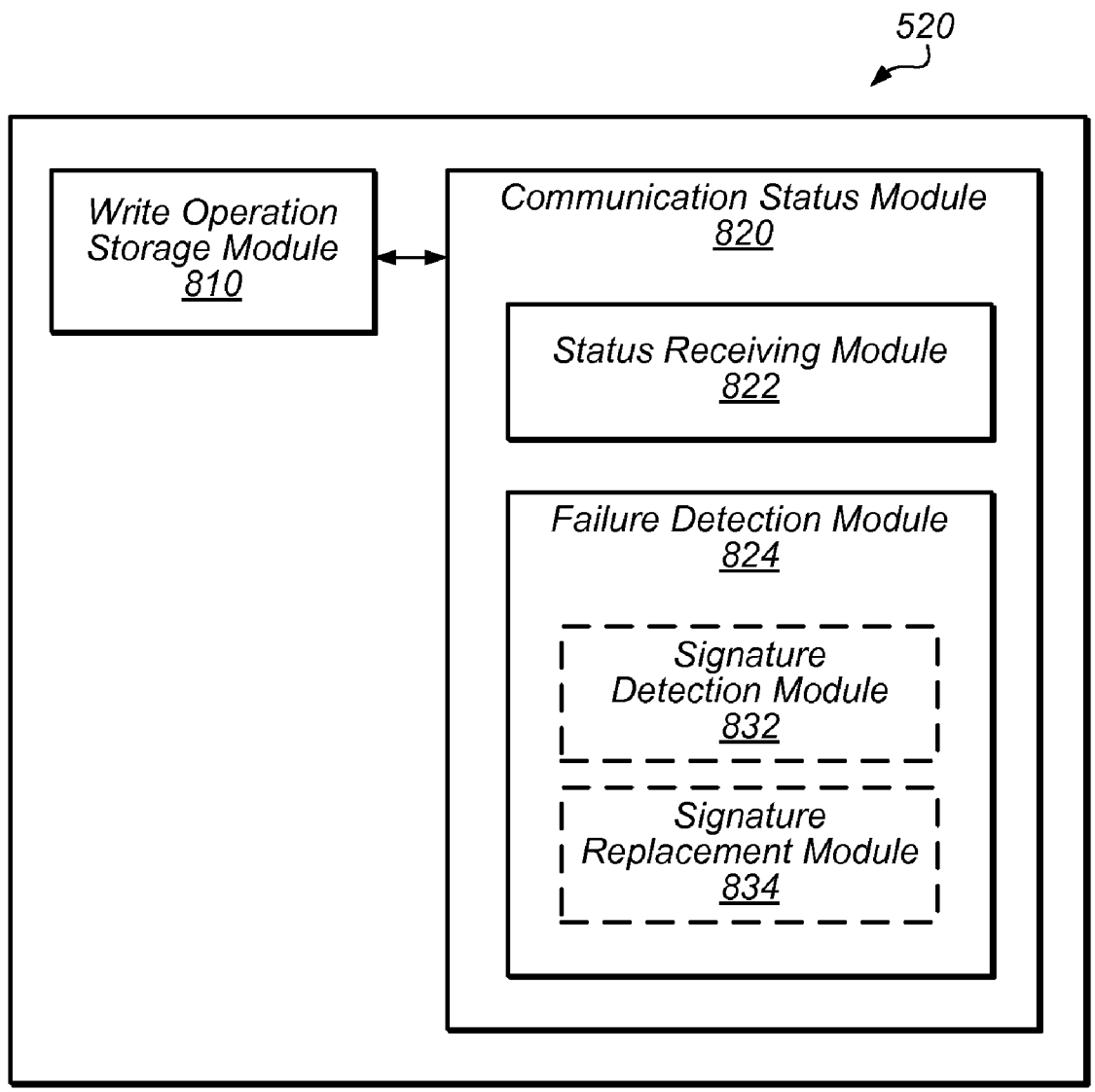
FIG. 8A is a block diagram illustrating one embodiment of various modules within memory of a backup storage device for determining a source of failure in a cluster configuration.

Turning now to FIG. 8A, a block diagram of various modules within memory 520 of backup storage device 130 is depicted. As shown, memory 520 includes a write operation storage module 810 and a communication status module 820. In some embodiments, modules 810 and 820 include program instructions that are executable in parallel and thus may interact with one another (as indicated by the double-headed connecting arrow in FIG. 8A). In the illustrated embodiment, module 820 includes a status receiving module 822 and a failure detection module 824. In some embodiments, failure detection module 824 includes a signature detection module 832 and a signature replacement module 834. In various embodiments, a greater or lesser number of modules may be used. In some embodiments, modules 810 and 820 may be implemented in software using program instructions that are executed by backup storage device 130. In an alternate embodiment, modules 810 and 820 may be implemented by logic within backup storage device 130.

In one embodiment, write operation storage module 810 stores a log of write operations made to production storage devices 120 where the information in the log is usable to reconstruct a previous state of a production storage device 120. In some embodiments, various write operations are made by different instances of distributed application 226 executing on host computers 110.

In one embodiment, status receiving module 822 includes program instructions executable to receive status information from host computers 110, where receipt of the status information from a given host computer 100 indicates that the host computer 110 and a communication path (e.g., of interconnect 140B) between the host computer 110 and backup storage device 130 are currently operational. For example, if instructions in module 822 determine that heartbeat information has not been received from a particular host computer 110 within an allotted time period, it may be the case that computer 110 may have failed; alternately, a communication path between that computer 110 and backup storage device 130 may have failed. In some embodiments, instructions in module 810 may not allow a reconstruction of any data associated with write operations received during a given period until module 822 has received status information from each host computer 110. (For example, backup storage device 130 may receive information about a write operation A, stop receiving status information from a host computer 110, and then receive information about a write operation B. In these circumstances, device 130 may permit a reconstruction of a previous state having data written during write operation A. Device 130 may, however, prohibit the reconstruction of any state having data written during write operation B until a corrective action is taken. For example, device 130 continue to prohibit reconstruction of those states until it can synchronize with the production storage device 120 that was written to by the performance of write operation B.) In various embodiments, instructions in module 822 may also receive status information from a host computer 110 indicating that it will no longer be providing heartbeat information (e.g., when a particular host computer 110 is powered off or otherwise taken offline).

In one embodiment, failure detection module 824 includes instructions executable to determine whether a failure to receive status information from a given host computer 110 indicates a) that write operations from a host computer 110 to production storage devices 120 device have ceased (e.g., because of a failure of that host computer 110), or b) that write operations are being made by the host computer 110 to production storage devices 120 without being logged by backup storage device 130 (e.g., because of a failure of a communication path of interconnect 140B between that host computer 110 and backup storage device 130). In some embodiments, module 824 determines the source of the failure by causing backup storage device 130 to enter a mode of operation in which device 130 reads from a guard block 414 in logical storage unit 410 corresponding to a production storage device 120, and in which reading a predetermined data value from the guard block indicates that host computer 110 has performed at least one write operation elsewhere in a production storage device 120. In one embodiment, failure detection module 824 includes a signature detection module 832 that includes program instructions executable to read from the guard block. In some embodiments, failure detection module 824 also includes instructions executable to modify the signature to indicate to the host computer 110 that the backup storage device 130 is operational. In one embodiment, failure detection module 824 includes a signature replacement module 834 that includes instructions executable to replace the signature by writing the guard block with the value that it held prior to entering the signature writing/modifying mode (e.g., in the event that the guard block is a storage location being used by some application).

Figure 8B:
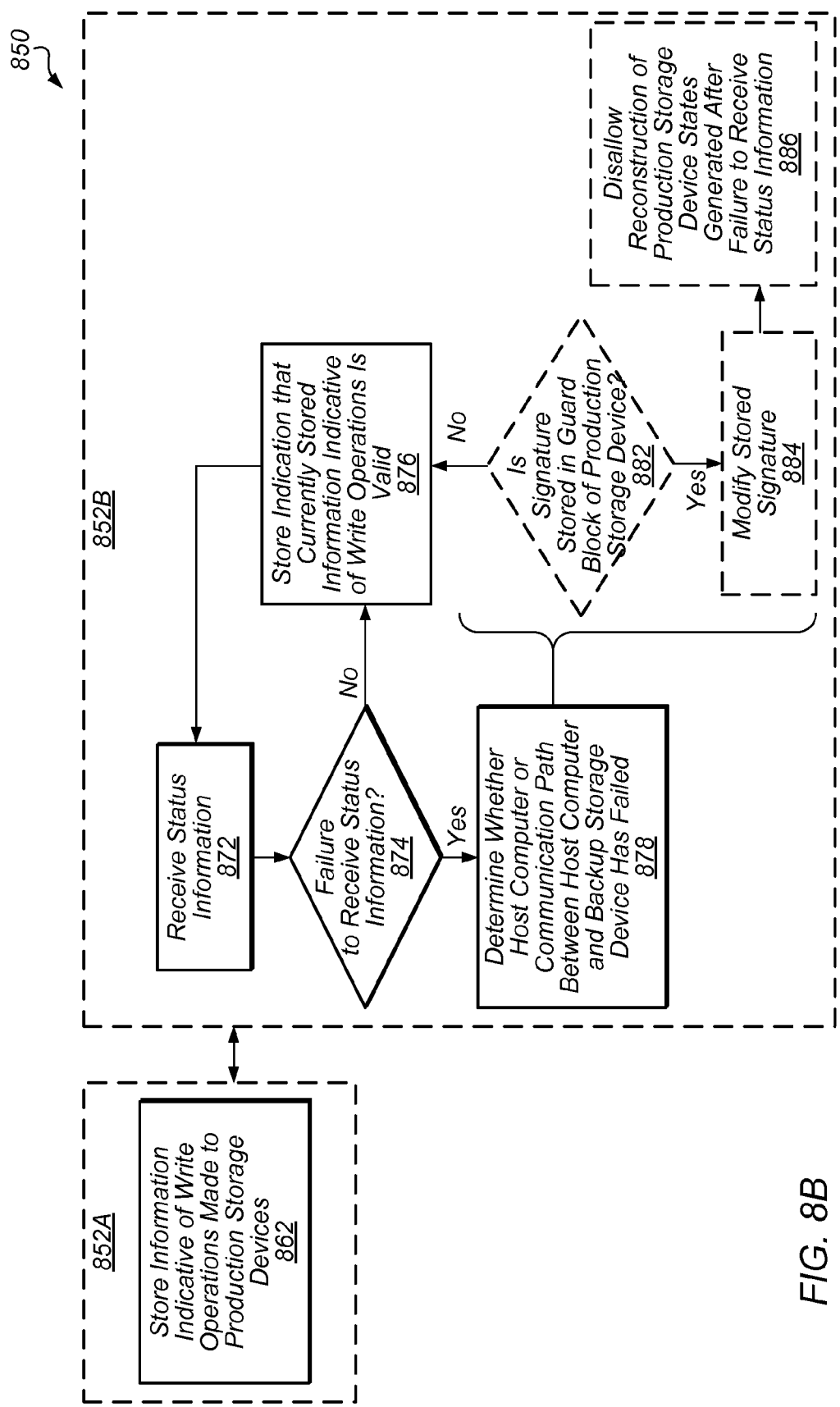
FIG. 8B is a flow diagram illustrating one embodiment of a method implemented by a backup storage device for determining a source of failure in a cluster configuration.

The operation of modules 810 and 820 are described in greater detail in conjunction with FIG. 8B presented below.

Turning now to FIG. 8B, one embodiment of a method performed by backup storage device 130 is depicted. As shown, method 850 includes submethods 852A and 852B that may be performed parallel and thus interact with one another. Submethod 852A is one embodiment of a method for maintaining information indicative of write operations. In the illustrated embodiment, submethod 852A includes step 862. Submethod 852B is one embodiment of a method for monitoring the communication between host computers 110 and backup storage device 130. In the illustrated embodiment, submethod 852B includes steps 872-878. Method 850 may be performed using program instructions that are executed by backup storage device 130 (e.g., application 132) and/or using logic within backup storage device 130.

Submethod 852A begins in step 862 with backup storage device 130 storing (e.g., using module 810) information indicative of write operations made to production storage devices 120, where the stored information is usable to reconstruct previous states of production storage devices 120. As noted above, the stored information may include, in some embodiments, an address of a write operation, the corresponding write data, and a timestamp associated with the write operation. In some embodiments, the write operations are made by different instances of distributed application 226 executing on host computers 110. In various embodiments, backup storage device 130 will continue to log write operations in the event that a host computer 110 or a communication path between the host computer 110 and the backup storage device 130 fails.

Submethod 852B begins in step 872 with backup storage device 130 receiving (e.g., using module 822) status information from each host computer 110 indicating that the host computer 110 and a communication path (e.g., of interconnect 140B) between the host computer 110 and backup storage device 130 are currently operational. In various embodiments, backup storage device 130 may also receive status information from a host computer 110 indicating that it will no longer be providing heartbeat information, e.g., because the host computer 110 may be shutting down, disconnecting from devices 120 and 130, etc.

In step 874, backup storage device 130 determines (e.g., using module 824) whether it has failed to receive status information from any host computer 110. If backup storage device 130 has determined that a host computer 110 has failed to send status information within a predetermined time interval, device 130 proceeds to step 878. Otherwise, device 130 proceeds to step 876.

In step 876, backup storage device 130 stores one or more indications that currently (that is, received prior to the successful reception of status information in steps 872 and 874) stored information indicative of write operations is valid. In one embodiment, backup storage device 130 stores a time stamp indicating when the last successful reception of status information occurred. In another embodiment, backup storage device 130 stores an indication with the stored information of each write operation that identifies if stored information associated with that write operation is valid. In various embodiments, backup storage device 130 determines whether to allow the reconstruction of a state of a production storage device 120 based on whether the stored information associated with that state is valid. If portions of the stored information are invalid (e.g., the stored information includes portions of data that were received after the determination in step 874), backup storage device 130 may prevent reconstruction of that state. Otherwise, backup storage device 130 may permit reconstruction of that state.

In step 878, backup storage device 130 determines (e.g., using module 824) a) whether write operations from a host computer 110 to production storage devices 120 have ceased, or b) whether write operations are being made by the host computer 110 to production storage devices 120 without being recorded by device 130. For example, the host computer 110 or a communication path between the host computer 110 and backup storage device 130 may have failed, preventing an indication of write operations from being received. In one embodiment, backup storage device 130 may determine whether write operations have ceased or write operations are being made by accessing a storage location in a production storage device 120, as described in substeps 882-886 discussed below.

In substep 882, backup storage device 130 determines (e.g., using module 832) whether a signature is stored in a guard block 414 of a production storage device 120. If backup storage device 130 does not find a signature in a production storage device 120, then the host computer 110 has not written to a production storage device 120. As a result, backup storage device 130 proceeds to step 876 and continues to store write operations of other host computers 110. On the other hand, if a signature of the host computer 110 is found, that computer 110 did write to a production storage device 120. In substep 884, backup storage device 130 modifies (e.g., using module 834) the stored signature to indicate to the host computer 110 that it also remains operational. In some embodiments, backup storage device 130 modifies the signature by replacing it with the original data that was overwritten when the signature was stored. In substep 886, backup storage device 130 also disallows reconstruction of any production storage devices states generated after device 130 failed to receive status information from one of the host computers 110. In one embodiment, backup storage device 130 prevents the restoration of such states until it can synchronize with each production storage device 120 that has stored data since the communication path between the host computer 110 and backup storage device 130 failed.

Figure 9:
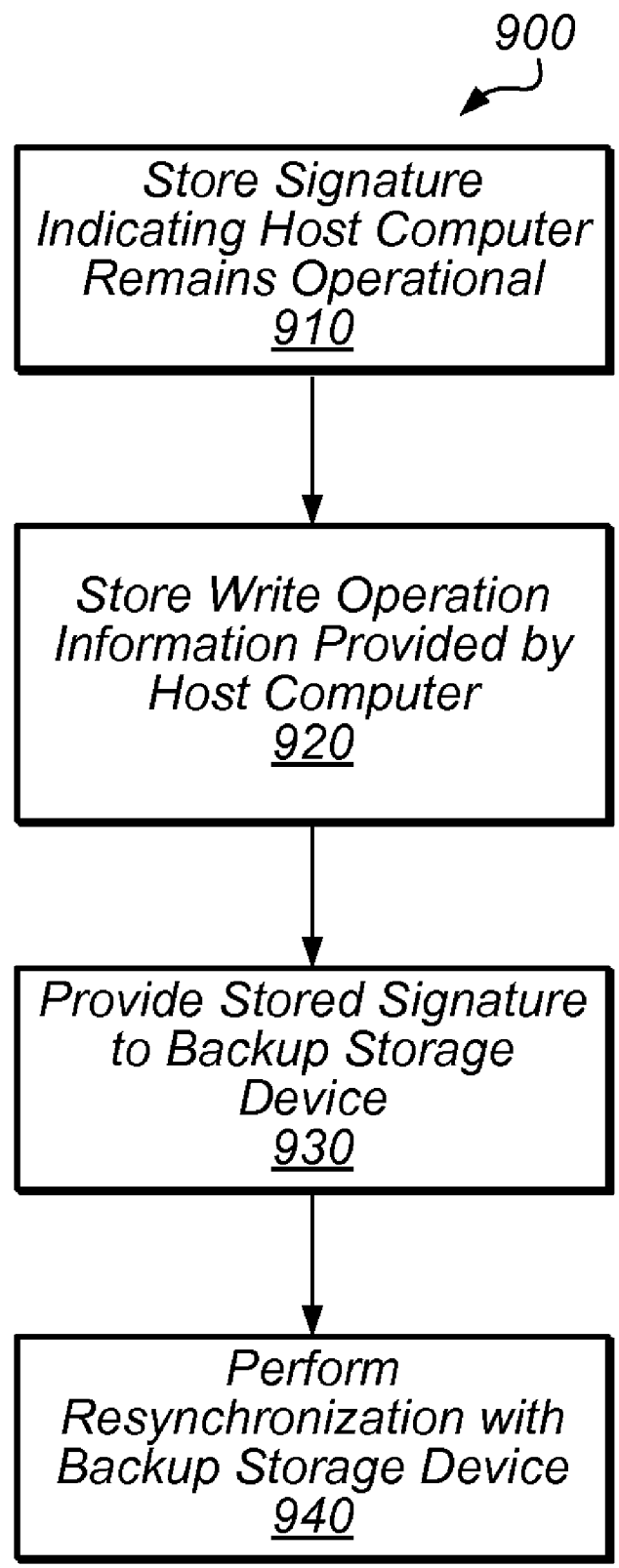
FIG. 9 is a flow diagram illustrating one embodiment of a method implemented by a production storage device for determining a source of failure in a cluster configuration.

Turning now to FIG. 9, one embodiment of a method performed by production storage device 120 is depicted. In one embodiment, production storage device 120 perform is method 900 after a communication path (e.g., of interconnect 140B) between a host computer 110 and backup storage device 130 has failed. Method 900 may be performed using program instructions that are executed by production storage device 120 and/or using logic within production storage device 120. In step 910, production storage device 120 stores a signature indicating that a host computer 110 remains operational. As described above, this signature may be written in one embodiment by host computer 110. In step 920, production storage device 120 stores write operation information provided by host computer 920 (that is, the write operation is performed). In step 930, production storage device 120 provides the stored signature to backup storage device 130. In step 940, production storage device 120 performs a resynchronization with backup storage device 130 in order to ensure that the contents of device 120 and the stored log in device 130 are coherent.

Figure 10A:
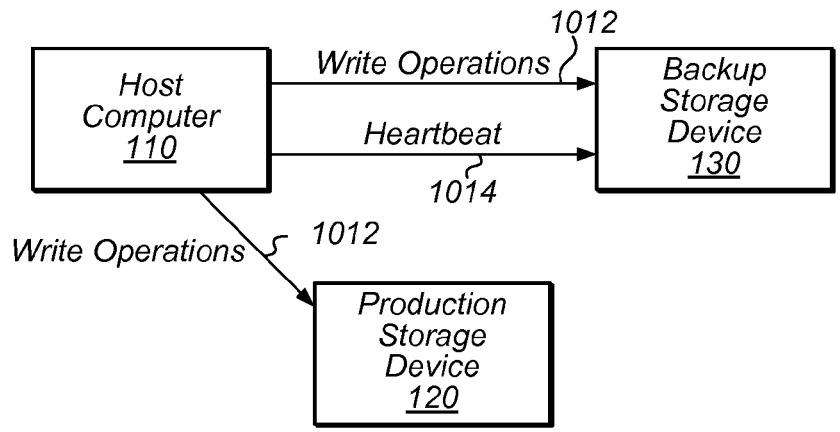
FIGS. 10A-C illustrate an example of an interaction between a host computer and a backup storage device using the methods depicted in FIGS. 7B and 8B.
Figure 10B:
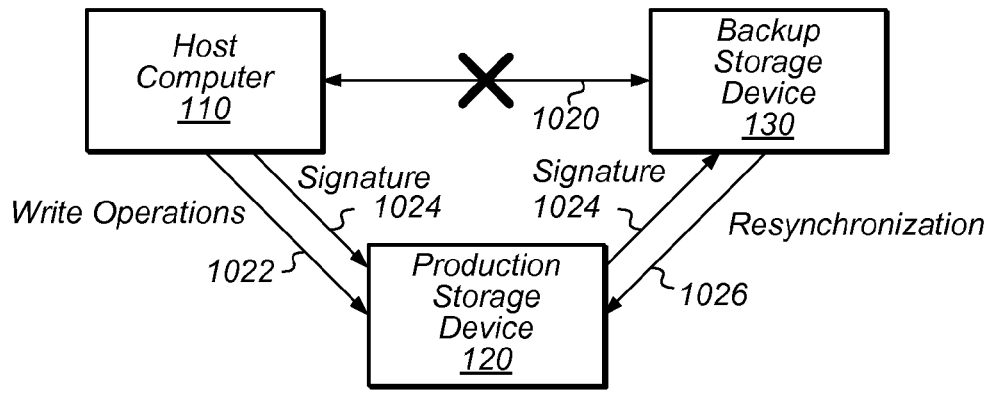
Figure 10C:
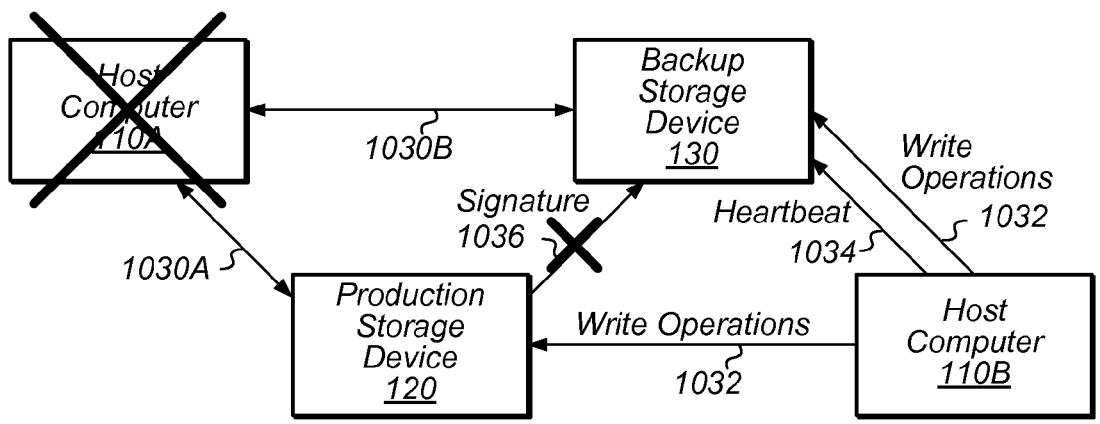

Turning now to FIGS. 10A-C, examples of interactions between host computers 110, production storage device 120, and backup storage device 130 are illustrated. In FIG. 10A, host computer 110 performs write operations 1012 to production storage device 120. In one embodiment, software executing on a processor within computer 110 intercepts the write operation, and "splits" the write by sending it both to device 120 (to effectuate the write operation) and to device 130 (where information indicative of the write is to be stored, e.g., in a log). Software executing on computer 110 also provides a heartbeat 1014 (or other status information). Reception of heartbeat 1014 indicates to device 130 that computer 110 and the communication path between computer 110 and device 130 remain operational. As discussed above, device 130 may respond to heartbeat 1014 by an acknowledgement (not depicted), so that host computer 110 knows heartbeat 1014 was received successfully by device 130.

FIG. 10B illustrates a situation in which communication path 1020 between host computer 110 and backup storage device 130 has failed. Once host computer 110 detects that it is unable to split write operations 1022 (e.g., because it receives a failure from its network controller, it does not receive an acknowledgement from 130, etc.) it continues to perform write operations 1022 to production storage device 120, but it also stores a signature 1024 to the production storage device 120 in order to indicate that computer 110 remains operational and that write operations have been performed since communication path 1020 failed. In one embodiment, after a predetermined time interval, backup storage device 130 reads device 120 and determines that signature 1024 has been stored thereon. Backup storage device 130 may then perform a subsequent resynchronization 1026 to ensure that its log of write operations is coherent with the current state of device 120.

FIG. 10C illustrates a situation in which host computer 110A has failed even though communication paths 1030A and 1030B are operational. As shown, host computer 110B remains operational and continues to perform write operations 1032 to production storage device 120. After a predetermined time interval, backup storage device 130 determines that production storage device 120 does not include a signature 1036 written by host computer 110A; thus, computer 110A is not performing write operations to production storage device 120. Although host computer 110A has failed, backup storage device 130 still stores an indication of the write operations 1032 as long as host computer 110B provides such an indication.

Various embodiments described above refer to a system 100 having host computers 110 and backup storage device 130 that determine a source of failure in a cluster configuration. Although computers 110 and backup storage device 130 been described within the context of distributed computing systems, embodiments of the present disclosure may also be applicable to other systems that need to determine a source of failure between two communicating devices. For example, in one particular embodiment, a first computing device may provide heartbeat information to a second computing device via a first communication path. If the first path fails, the first computing device store an indication that it remains operational in a storage device that is accessible by the second computing device. Accordingly, embodiments of the present disclosure are not solely applicable to distributed computing systems but rather any devices that store or backup information.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   a first storage device storing a log of write operations to a second storage device, wherein the write operations are made by different instances of a distributed application executing on a plurality of host computer systems; and
   the first storage device determining whether a failure to receive status information from a first of the plurality of host computer systems indicates a) that write operations from the first host computer system to the second storage device have ceased, or b) that write operations are being made by the first host computer system to the second storage device without being logged by the first storage device.

2. The method of claim 1, wherein the plurality of host computer systems is arranged in a cluster configuration, and wherein the first and second storage devices are implemented within a storage area network (SAN).

3. The method of claim 1, wherein information in the log of write operations is usable to reconstruct a previous state of the second storage device, and wherein receipt of the status information by the first storage device from the first host computer system indicates that the first host computer system and a first communication path between the first host computer system and the first storage device on which the status information is transmitted are currently operational.

4. The method of claim 1, further comprising:
in response to determining that the write operations from the first host computer system to the second storage device have ceased, storing additional, subsequent write operations in the log, wherein the additional write operations are made by instances of the distributed application executing on ones of the plurality of host computer systems other than the first host computer system.

5. The method of claim 1, wherein said determining includes:
after detecting the failure to receive status information, the first storage device performing a check whether the second storage device is storing an indication that the first host computer system is performing write operations to the second storage device.

6. The method of claim 5, further comprising:
in response to the first storage device determining that write operations are being made by the first host computer system to the second storage device without being logged by the first storage device, the first storage device disallowing reconstruction of any previous state of the second storage device generated after the first storage device fails to receive the status information, wherein the disallowing continues until a corrective action is taken.

7. The method of claim 5, wherein the stored indication is stored in a storage location of the second storage device that previously stored data written by one of the instances of the distributed application.

8. A non-transitory computer readable medium having program instructions stored thereon that, if executed by a first of a plurality of host computers implementing a distributed application, cause the first host computer to perform a method comprising:
receiving information indicative of a write operation from a first instance of the distributed application executing on the first host computer;
providing the information indicative of the write operation to a first storage device;
providing information to a second storage device, wherein the information provided to the second storage device is usable to recreate the write operation;
sending heartbeat information to the second storage device via a first communication path to indicate that the first host computer is operational; and
in response to detecting an error in providing the information to the second storage device via the first communication path, communicating to second storage device via a second communication path to indicate that the first host computer remains operational.

9. The non-transitory computer readable medium of claim 8, wherein the plurality of host computers are within a cluster configuration, and wherein the first and second storage devices are located within a storage area network (SAN).

10. The non-transitory computer readable medium of claim 8, wherein said communicating to the second storage device via the second communication path includes the first host computer storing a signature in a memory storage location of the first storage device, wherein the signature indicates to the second storage device that the first host computer has written data to the first storage device.

11. The non-transitory computer readable medium of claim 10, the method further comprising the first host computer determining whether the stored signature has been modified by the second storage device within a predetermined time period, wherein modification of the signature indicates that the second storage device is operational.

12. The non-transitory computer readable medium of claim 11, the method further comprising:
in response to determining that the stored signature has not been modified within the predetermined time period, the first host computer replacing the stored signature with a set of data that was previously overwritten by said storing of the signature, wherein the set of data was written by an instance of the distributed application.

13. The non-transitory computer readable medium of claim 8, wherein the received information is captured from an I/O stack of the first host computer, wherein the I/O stack is configured to buffer write operations made by the first instance of the distributed application.

14. The non-transitory computer readable medium of claim 8, the method further comprising the first host computer providing additional information to the second storage device, wherein the additional information is usable to recreate write operations made to a plurality of other storage devices, and wherein said communicating includes the first host computer storing a signature on a single one of the second storage device and the plurality of other storage devices, wherein the signature indicates that the first host computer has written data to the second storage device or one of the plurality of other storage devices.

15. The non-transitory computer readable medium of claim 8, the method further comprising the first host computer indicating that the heartbeat information will no longer be sent to the second storage device.

16. A non-transitory computer readable medium having program instructions stored thereon that, if executed by a first storage system, cause the first storage system to perform a method comprising:
a first storage system maintaining information indicative of write operations made by a plurality of host computer systems to a second storage system, wherein said maintaining includes:
receiving status information from at least a first of the plurality of host computer systems, wherein the status information indicates that the first host computer system and a first communication path between the first host computer system and the first storage system are operational; and
in response to the first storage system not receiving the status information from the first host computer system within a predetermined time period, determining a) whether write operations from the first host computer system to the second storage system have ceased, or b) whether write operations are being made by the first host computer system to the second storage system without being recorded by the first storage system.

17. The non-transitory computer readable medium of claim 16, wherein host computers in the plurality of host computer systems are part of a computer cluster configuration, and wherein the second storage system is arranged in a storage area network (SAN) configuration.

18. The non-transitory computer readable medium of claim 16, wherein said determining includes the first storage system entering a mode of operation in which the first storage system searches for a signature that has been stored within a guard block on a first of a plurality of logical storage units of the second storage system by the first host computer system, wherein the signature indicates that the first host computer system has written data to the second storage system.

19. The non-transitory computer readable medium of claim 18, wherein the plurality of logical storage units are associated with a plurality of physical storage units located within a common enclosure, and wherein the first storage system searches for the signature on a single one of the plurality of logical storage units.

20. The non-transitory computer readable medium of claim 16, wherein said determining includes determining whether the first host computer system or the first communication path has failed.

* * * * *